United States Patent
Becker (10) Patent No.: US 12,417,621 B2
(45) Date of Patent: Sep. 16, 2025

(54) INFORMATION PROCESSING DEVICE AND INFORMATION PROCESSING METHOD

(71) Applicant: Sony Group Corporation, Tokyo (JP)

(72) Inventor: Florian Becker, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 428 days.

(21) Appl. No.: 18/085,577

(22) Filed: Dec. 21, 2022

(65) Prior Publication Data

US 2023/0245434 A1    Aug. 3, 2023

(30) Foreign Application Priority Data

Feb. 2, 2022    (EP) .................................... 22154765

(51) Int. Cl.
| | |
|---|---|
| *G06V 20/58* | (2022.01) |
| *G01S 13/86* | (2006.01) |
| *G01S 17/86* | (2020.01) |
| *G06V 10/80* | (2022.01) |
| *G06V 10/25* | (2022.01) |
| *G06V 10/82* | (2022.01) |

(52) U.S. Cl.
CPC .......... *G06V 10/803* (2022.01); *G01S 13/865* (2013.01); *G01S 13/867* (2013.01); *G01S 17/86* (2020.01); *G06V 10/806* (2022.01); *G06V 20/58* (2022.01); *G06V 10/25* (2022.01); *G06V 10/82* (2022.01)

(58) Field of Classification Search
None
See application file for complete search history.

(56) References Cited

U.S. PATENT DOCUMENTS

2012/0313742 A1*  12/2012  Kurs .................... B60L 53/126
                                                                336/180

FOREIGN PATENT DOCUMENTS

| EP | 3525000 B1 | 7/2021 |
|---|---|---|
| WO | 2018/204128 A1 | 11/2018 |
| WO | 2019/198076 A1 | 10/2019 |
| WO | 2021/058300 A1 | 4/2021 |

OTHER PUBLICATIONS

Feng et al., "Deep Multi-Modal Object Detection and Semantic Segmentation for Autonomous Driving: Datasets, Methods, and Challenges", IEEE Transactions on Intelligent Transportation Systems, vol. 22, Issue 3, Feb. 17, 2020, 1 page.

\* cited by examiner

*Primary Examiner* — Idowu O Osifade
(74) *Attorney, Agent, or Firm* — XSENSUS LLP (57) ABSTRACT

An information processing device for a vehicle for sensor data fusion for object detection, including circuitry configured to:
 obtain, based on obtained first sensor data from a first sensor of the vehicle and a first predetermined object pose probability model, first object pose probability data, wherein the first predetermined object pose probability model is specific for the first sensor;
 obtain, based on obtained second sensor data from a second sensor of the vehicle and a second predetermined object pose probability model, second object pose probability data, wherein the second predetermined object pose probability model is specific for the second sensor; and
 fuse the first and the second object pose probability data to obtain fused object pose probability data for object detection.

20 Claims, 7 Drawing Sheets

Obtaining, based on obtained first sensor data from a first sensor of the vehicle and a first predetermined object pose probability model, first object pose probability data, wherein the first predetermined object pose probability model is specific for the first sensor 201

Obtaining, based on obtained second sensor data from a second sensor of the vehicle and a second predetermined object pose probability model, second object pose probability data, wherein the second predetermined object pose probability model is specific for the second sensor 202

Fusing the first and the second object pose probability data to obtain fused object pose probability data for object detection 203

Fig. 9

INFORMATION PROCESSING DEVICE AND INFORMATION PROCESSING METHOD

CROSS-REFERENCE TO RELATED APPLICATION

This patent application is based on and claims priority pursuant to European Patent Application No. 22154765.6, filed on Feb. 2, 2022, in the European Patent Office, the entire disclosure of which is hereby incorporated by reference herein.

TECHNICAL FIELD

The present disclosure generally pertains to an information processing device and a corresponding information processing method for a vehicle for sensor data fusion for object detection.

TECHNICAL BACKGROUND

Generally, systems for autonomous navigation of autonomous vehicles (e.g., cars, UAV ("unmanned aerial vehicle"), etc. or manned vehicles with driver-assistance systems (e.g., supporting a human driver/pilot) need to have an understanding of their surrounding environment which may be is addressed by fusing information from several sensors (e.g., cameras, radar devices, light-detection-and-ranging ("LiDAR") devices).

In some cases, as generally known, a single sensor may be insufficient to fulfill the application precision, accuracy and coverage requirements. Thus, it is known, to combine (namely fused) the measurements of different sensors of typically different type (also known as sensor data fusion).

Known sensor data fusion methods typically process the measurements per sensor independently until a common mid-level or high-level representation is obtained which allows the fusion of the information.

Although there exist techniques for sensor data fusion, it is generally desirable to improve the existing techniques.

SUMMARY

According to a first aspect the disclosure provides an information processing device for a vehicle for sensor data fusion for object detection, comprising circuitry configured to:
  obtain, based on obtained first sensor data from a first sensor of the vehicle and a first predetermined object pose probability model, first object pose probability data, wherein the first predetermined object pose probability model is specific for the first sensor;
  obtain, based on obtained second sensor data from a second sensor of the vehicle and a second predetermined object pose probability model, second object pose probability data, wherein the second predetermined object pose probability model is specific for the second sensor; and
  fuse the first and the second object pose probability data to obtain fused object pose probability data for object detection.

According to a second aspect the disclosure provides an information processing method for a vehicle for sensor data fusion for object detection, comprising:
  obtaining, based on obtained first sensor data from a first sensor of the vehicle and a first predetermined object pose probability model, first object pose probability data, wherein the first predetermined object pose probability model is specific for the first sensor;
  obtaining, based on obtained second sensor data from a second sensor of the vehicle and a second predetermined object pose probability model, second object pose probability data, wherein the second predetermined object pose probability model is specific for the second sensor; and
  fusing the first and the second object pose probability data to obtain fused object pose probability data for object detection.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 4:
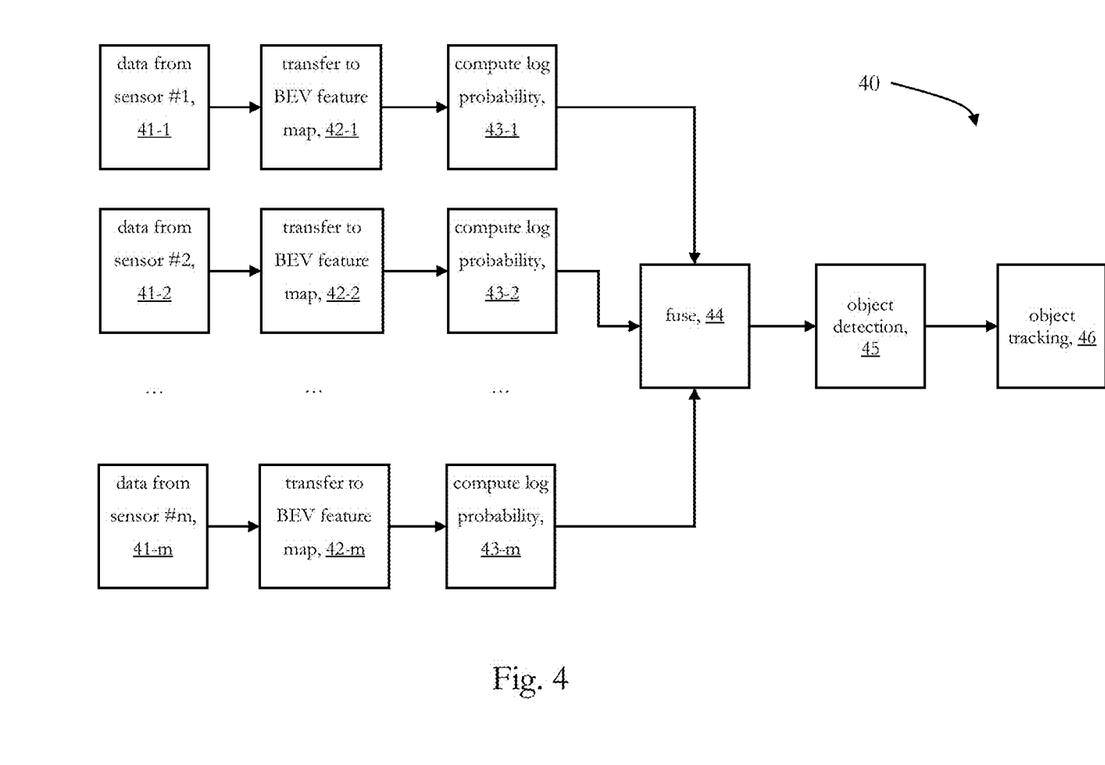
FIG. 4 schematically illustrates in a block diagram an embodiment of an information processing method for object detection.

Before a detailed description of the embodiments under reference of FIG. 4 is given, general explanations are made.

As mentioned in the outset, generally, systems for autonomous navigation of autonomous vehicles (e.g., cars, UAV ("unmanned aerial vehicle"), etc. or manned vehicles with driver-assistance systems (e.g., supporting a human driver/pilot) need to have an understanding of their surrounding environment which is addressed by fusing information from several sensors (e.g., cameras, radar devices, light-detection-and-ranging ("LiDAR") devices) in some embodiments.

In some embodiments, objects, in particular moving objects such as cars, are detected based on the fused information from different sensors.

For enhancing the general understanding of the present disclosure, an embodiment of a vehicle 1 including a plurality of sensors 2, 3 and 4 and an embodiment of an information processing device 5 is discussed in the following under reference of FIG. 1, which schematically illustrates the embodiment, and which applies also to other embodiments of the present disclosure.

The vehicle 1 is a car and includes radar devices 2, stereo cameras 3, a LiDAR device 4, and the information processing device 5. The radar devices 2, the stereo cameras 3 and the LiDAR device 4 provide their sensor data to the information processing device 5, for example, via a CAN ("Controller Area Network")-Bus for sensor data fusion and object detection.

The field of view of the radar devices 2 is schematically illustrated by the solid lined triangles, the field of view of the stereo cameras 3 is schematically illustrated by the dotted lined triangles, and the field of view of the LiDAR device 4 is schematically illustrated by the dashed lined circle.

In this embodiment, the radar devices 2 acquires radar sensor data by emitting a radar signal and detecting a time-of-flight and signal strength of a reflected (or back-scattered) part of the radar signal (e.g., reflected an object in the field of view of the radar devices 2) which is indicative for a radial distance, a vertical and horizontal angle, and a radial velocity, as generally known.

As generally known, the stereo cameras 3 acquires image sensor data representing two images from different viewpoints from which a three-dimensional position of a point, visible in both images, can be triangulated using established methods.

The LiDAR device 4 acquires optical time-of-flight sensor data by emitting a light signal (e.g., laser light in the visible or infrared spectrum) and detecting a time-of-flight and a signal strength of a reflected (or back-scattered) part of the light signal (e.g., reflected an object in the field of view of the LiDAR device 1) which is indicative for a distance and a direction to an object.

The information processing device 5 obtains the sensor data and fuses the information for detecting an object, as will be discussed herein, in particular under reference of FIGS. 5 to 9 further below.

Returning to the general explanations, as further mentioned in the outset, known sensor data fusion methods typically process the measurements per sensor independently until a common mid-level or high-level representation is obtained which allows the fusion of the information.

Figure 2:
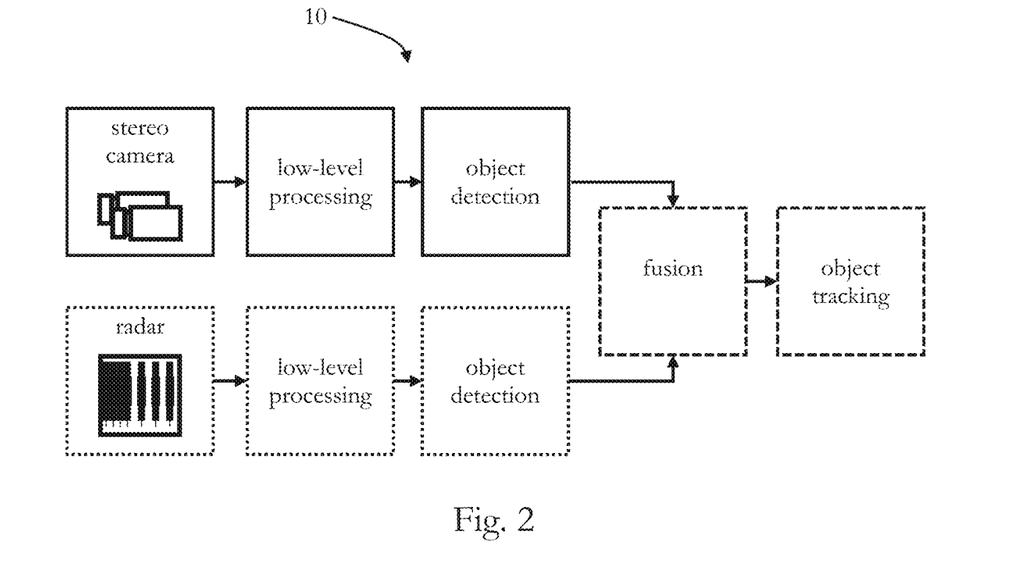
FIG. 2 schematically illustrates in a block diagram a known embodiment of an information processing method for object detection.
Figure 3:
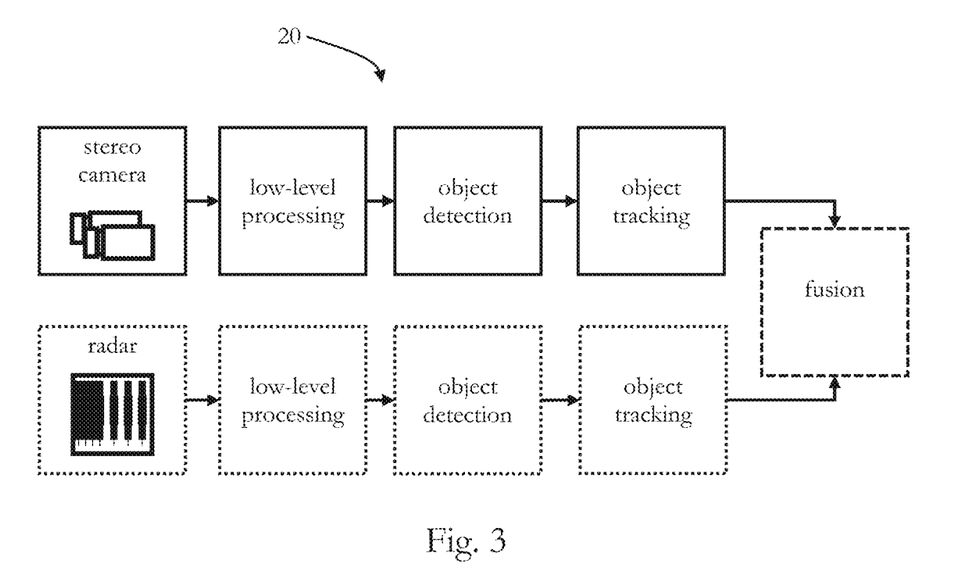
FIG. 3 schematically illustrates in a block diagram a known embodiment of an information processing method for object detection.

For further enhancing the general understanding of the present disclosure, two known embodiment of an information processing method 10 and 20 for object detection are discussed in the following under reference of FIG. 2 and FIG. 3, respectively, which schematically illustrate the embodiments.

The information processing method 10 corresponds to a mid-level sensor data fusion approach.

For example, a stereo camera acquires image sensor data and performs some low-level processing such as, for instance, stereo reconstruction, semantic segmentation and feature extraction and provides then the data to an information processing device, which may further perform some low-level processing such as, for instance, coordinate transformations, feature extraction and feature map generation.

The information processing device detects an object by inferencing object pose probability data based on the image sensor data and analysis of the inferred object pose probability data.

Additionally, for example, a radar device acquires radar sensor data and performs some low-level processing such as, for instance, computing a beamformer cube and calculating radial distance etc. and provides then the data to the information processing device, which may further perform some low-level processing such as, for instance, coordinate transformations, feature extraction and feature map generation.

The information processing device detects an object by inferencing object pose probability data based on the radar sensor data and analysis of the inferred object pose probability data.

Then the information processing device fuses the detected objects and performs object tracking.

The information processing method 20 corresponds to a high-level sensor data fusion approach.

The information processing method 20 is similar to the information processing method 10 such that equal steps are not discussed again to avoid unnecessary repetition.

The information processing method 20 differs from the information processing method 10 in that the objects are tracked independently and then the tracked objects are fused.

Returning to the general explanations, however, it has been recognized that most information is available at a low-level representation, thus fusing there—dubbed early fusion—may have the potential to achieve better overall performance.

Furthermore, it has been recognized that the following processing (object detection and tracking) must be performed only once on the fused information instead for each sensor.

As generally known, measurements of different sensor types (radar device, stereo camera, LiDAR) have to be transferred into a common representation including coordinate system and units. It has thus been recognized that the representation should be designed based on the requirements of the application in some embodiments (and not based on the sensor properties in some embodiments).

Figure 1:
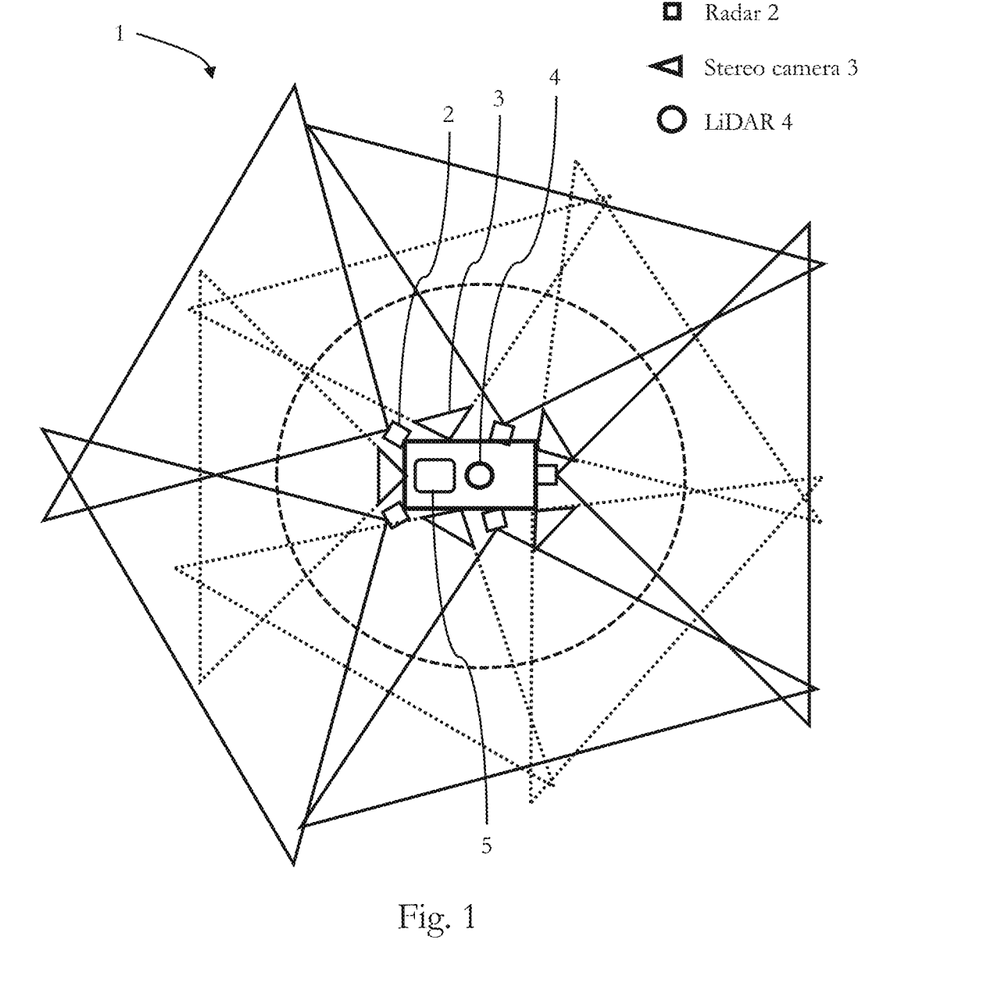
FIG. 1 schematically illustrate an embodiment of a vehicle including a plurality of sensors and an embodiment of an information processing device.

It has further been recognized that, for achieving a full environment perception, sensors with partly or non-overlapping field of views or ranges may have to be combined when the application requires to cover the whole surrounding (360°, surround view), as illustrated in FIG. 1.

Moreover, it has been recognized that the sensor- and position-specific measurement properties may have to be described in order to preserve the precise and discard the imprecise components and that it should be possible to judge the precision of the fused result.

Additionally, it has been recognized that the fusion approach should scale well with the number of sensors and sensor types and that adding more sensors should be possible at reasonable additional costs for fusing the information and for training machine learning components.

The embodiments discussed herein may provide a generic framework for fusing sensors of different type and coverage at an early data abstraction level, using a common, sensor-agnostic full environment representation, which may have the capabilities to describe imprecisions well, wherein objects of a specific class are detected (including the pose which is the position and the orientation ("posture") of the object) in some embodiments.

Hence, some embodiments pertain to an information processing device for a vehicle for sensor data fusion for object detection, wherein the information processing device includes circuitry configured to:

obtain, based on obtained first sensor data from a first sensor of the vehicle and a first predetermined object pose probability model, first object pose probability data, wherein the first predetermined object pose probability model is specific for the first sensor;

obtain, based on obtained second sensor data from a second sensor of the vehicle and a second predetermined object pose probability model, second object pose probability data, wherein the second predetermined object pose probability model is specific for the second sensor; and fuse the first and the second object pose probability data to obtain fused object pose probability data for object detection.

The information processing device may be a computer (e.g., a board-computer in the vehicle), a server, or the like and is not particularly limited.

The vehicle may be an autonomous vehicle or a manned vehicle (e.g., a(n) (autonomous) car, a(n) autonomous) robot, or the like) or an aerial vehicle (e.g., a(n) autonomous drone or the like).

The circuitry may be based on or may include or may be implemented as integrated circuitry logic or may be implemented by a CPU (central processing unit), an application processor, a graphical processing unit (GPU), a microcontroller, an FPGA (field programmable gate array), an ASIC (application specific integrated circuit) or the like. The functionality may be implemented by software executed by a processor such as an application processor or the like. The circuitry may be based on or may include or may be implemented by typical electronic components configured to achieve the functionality as described herein. The circuitry may be based on or may include or may be implemented in parts by typical electronic components and integrated circuitry logic and in parts by software.

The circuitry may include a communication interface configured to communicate and exchange data with a computer or processor (e.g., an application processor or the like) or sensor (device) over a network (e.g. the internet) via a wired or a wireless connection such as WiFi®, Bluetooth® or a mobile telecommunications system which may be based on UMTS, LTE or the like (and implements corresponding communication protocols).

The circuitry may include data storage capabilities to store data such as memory which may be based on semiconductor storage technology (e.g. RAM, EPROM, etc.) or magnetic storage technology (e.g. a hard disk drive) or the like.

In some embodiments, the first and second sensor are one of (independently selected from) a stereo camera, a radar device and a light-detection-and-ranging device ("LiDAR device"). The first and the second sensor may further be a single camera or an indirect time-of-flight device or the like.

Accordingly, in some embodiments, the first and second sensor data are one of image sensor data, radar data and optical time-of-flight data.

The first and second sensor data may include or may be the raw data obtained from the first and second sensor, respectively, such that the circuitry may further be configured to preprocess the raw data to extract features and position information of the extracted features with respect to a three-dimensional coordinate system.

The first and second sensor data may include or may be feature data, wherein the first and second sensor, respectively, have preprocessed the raw data to extract features and position information of the extracted features with respect to a three-dimensional coordinate system.

The first and second object pose probability data represent, in some embodiments, a probability or a logarithm of the probability that an object is present with a certain pose (at a certain position and with a certain orientation relative to the vehicle).

In some embodiments, the position of the object is indicated with respect to a two-dimensional sub-space of a three-dimensional coordinate system (for example, the x-y-plane in a Cartesian coordinate system), wherein the two-dimensional sub-space is divided into a plurality of lateral cells ("grid") and each of the plurality of lateral cells is assigned a probability or a logarithm of the probability that an object is present in the respective lateral cell with a certain orientation.

The first and second predetermined object pose probability model represents, in some embodiments, a calculation scheme (or a set of predetermined instructions) which has as input the first and second sensor data and outputs the first and second object pose probability data.

In some embodiments, the first and the second predetermined object pose probability model is trained for at least one predetermined object or object type (e.g., cars, pedestrians, traffic signs, etc.).

However, the first and second predetermined object pose probability model is not required to compare the features represented in the first and second sensor data to predetermined features of the predetermined object for obtaining the first and second object pose probability data, respectively.

The circuitry fuses (or combines) the first and the second object pose probability data to obtain fused (or combined) object pose probability data for object detection.

In some embodiments, the circuitry fuses (or combines) the first and the second object pose probability data by summation of the first and second object pose probability data for each lateral cell, wherein the first and second object pose probability data is the logarithm of the probability that an object is present in the respective lateral cell.

In some embodiments, the circuitry is further configured to detect an object, based on the fused object pose probability data.

In some embodiments, the circuitry is further configured detect extrema in the fused object pose probability data, and to detect the object based on the detected extrema.

In some embodiments, the circuitry is configured to detect the object using non-suppression on the fused object pose probability data.

In some embodiments, wherein the circuitry is further configured to track the detected object.

The circuitry may track the detected object based on, for example, an Extended Kalman Filter ("EKF") for temporal fusion and filtering, a bicycle model as dynamic model for the EKF, or the Hungarian algorithm for data association.

In some embodiments, the circuitry is further configured to perform, based on at least one of the first and second sensor data, an ego-motion estimation of the vehicle, as generally known.

In some embodiments, the circuitry is configured to obtain, in the first and the second predetermined object pose probability model, the first and the second object pose probability data based on learned weights. Such embodiments will be discussed under reference of FIGS. 4, 5, 6, 7, and 8.

In some embodiments, the learned weights are precomputed. Such embodiments will be discussed under reference of FIGS. 4, 5, 6, 7, and 8.

In some embodiments, the circuitry is further configured to generate, based on the obtained first and second sensor data, a first and a second feature map, respectively. Such embodiments will be discussed under reference of FIGS. 4, 5, 6, 7, and 8.

In some embodiments, the first and the second feature map, respectively, includes a plurality of sub-feature maps, wherein each of the plurality of sub-feature maps is associated with one of a plurality of lateral cell block layers in a three-dimensional coordinate system, wherein the three-dimensional coordinate system is divided into a plurality of cell blocks arranged in lateral cell block layers, wherein the lateral cell block layers are stacked. Such embodiments will be discussed under reference of FIGS. 4, 5, 6, 7, and 8.

In some embodiments, each of the plurality of sub-feature maps includes a plurality of lateral cells, wherein each lateral cell of the plurality of lateral cells is assigned at least a first feature component. Such embodiments will be discussed under reference of FIGS. 4, 5, 6, 7, and 8.

In some embodiments, the first feature component corresponds to a number of features detected in a lateral cell block of the associated lateral cell block layer, wherein the lateral cell block is associated with a lateral cell of the associated sub-feature map. Such embodiments will be discussed under reference of FIGS. 4, 5, 6, 7, and 8.

In some embodiments, each lateral cell of the plurality of lateral cells is further assigned a second feature component, wherein the second feature component is based on at least one of a field of view of the respective sensor, a spatial resolution of the respective sensor, and a detection signal strength measured with the respective sensor. Such embodiments will be discussed under reference of FIGS. 4, 5, 6, 7, and 8.

In some embodiments, for a stereo camera or a light-detection-and-ranging device as a sensor, the second feature component is based on a field of view and the spatial resolution of the stereo camera. Such embodiments will be discussed under reference of FIGS. 4, 5, 6, 7, and 8.

In some embodiments, for a radar device as a sensor, the second feature component is based on a detection signal strength. Such embodiments will be discussed under reference of FIGS. 4, 5, 6, 7, and 8.

In some embodiments, the circuitry is configured to obtain the first and the second object pose probability data by a convolution of base functions with the learned weights. Such embodiments will be discussed under reference of FIGS. 4, 5, 6, 7, and 8.

In some embodiments, the base functions depend on the feature map. Such embodiments will be discussed under reference of FIGS. 4, 5, 6, 7, and 8.

In some embodiments, the base functions are based on the first and second feature component. Such embodiments will be discussed under reference of FIGS. 4, 5, 6, 7, and 8.

In some embodiments, the learned weights are learned for at least one predetermined object type.

In some embodiments, the learned weights are weights of a neural network.

In some embodiments, the neural network is a convolutional neural network.

In some embodiments, the circuitry is further configured to detect a region of interest based on at least one of the first and second object pose probability data.

In some embodiments, the circuitry is further configured to fuse the first and the second object pose probability data only for the detected region of interest.

Some embodiments pertain to an information processing method for a vehicle for sensor data fusion for object detection, wherein the information processing method includes:

obtaining, based on obtained first sensor data from a first sensor of the vehicle and a first predetermined object pose probability model, first object pose probability data, wherein the first predetermined object pose probability model is specific for the first sensor;

obtaining, based on obtained second sensor data from a second sensor of the vehicle and a second predetermined object pose probability model, second object pose probability data, wherein the second predetermined object pose probability model is specific for the second sensor; and fusing the first and the second object pose probability data to obtain fused object pose probability data for object detection.

The information processing method may be performed by the information processing device as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 4, there is schematically illustrated in a block diagram an embodiment of an information processing method 40 for object detection, which is discussed in the following under reference of FIGS. 1, 4, 5, 6, 7, and 8.

The information processing method 40 is performed by the information processing device 5 included in the vehicle 1 of FIG. 1.

At 41-1 to 41-$m$, the information processing device 5 obtains first sensor data from sensor #1, second sensor data from sensor #2 and so on, wherein, for example, sensor #1 is one of the radar devices 2 of FIG. 1, sensor #2 is one of the stereo cameras 3 of FIG. 1, and sensor #m is the LiDAR device 4 of FIG. 1.

Figure 5:
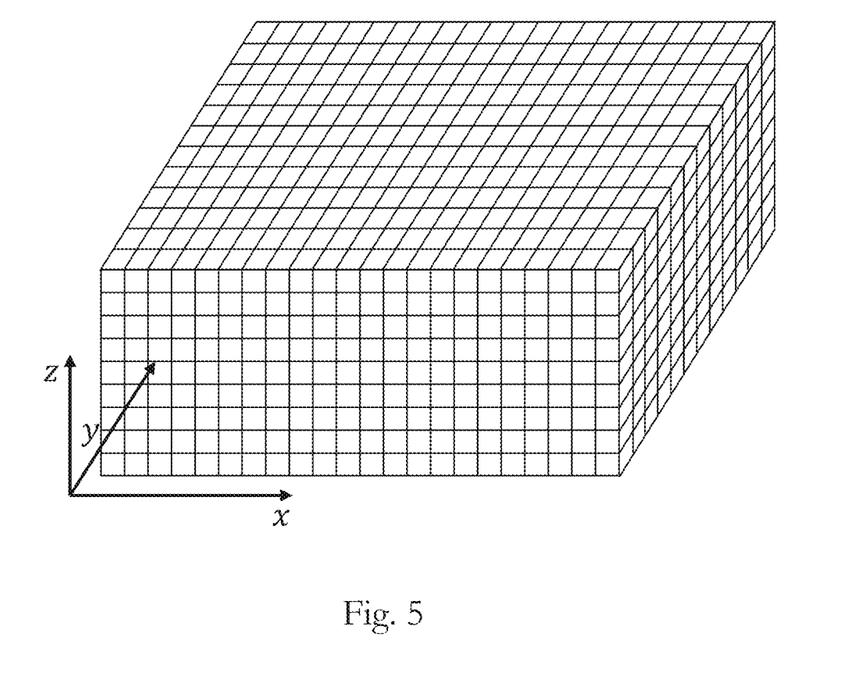
FIG. 5 schematically illustrates an embodiment of a coordinate system.

Referring now to FIG. 5, which schematically illustrates an embodiment of a coordinate system for enhancing the general understanding of the present disclosure.

The coordinate system is as follows: x, y and z describe the coordinate system originating in the center of the vehicle 1, x pointing forward, y pointing left and z upwards. In the following the angles θ relate to an orientation of an object in the x- y-plane, with θ=0 corresponding to orientation along (x, y)=(1,0), and $$\theta = \frac{\pi}{2}$$

corresponding to (x, y)=(0,1).

The coordinate system is thus a three-dimensional coordinate system, and it is divided into a plurality of cell blocks arranged in a plurality of lateral cell block layers, wherein the lateral cell block layers are stacked.

For illustration, without limiting the disclosure in this regard, a lateral cell block layer includes a first plurality of cell blocks from the plurality of cell blocks, wherein each of the first plurality of cell blocks has the same z-coordinate value.

A common data structure l is defined, representing the belief of the existence of objects and their pose in the environment of the (ego) vehicle 1 as a three-dimensional array.

Its three axes are:

x, y are the coordinates of a potential observed object—more precisely the object center; the coordinates are aligned with the coordinate system discussed above, limited to a region around the vehicle 1, and discretized, e.g., in steps of 0.1 m.

θ is the orientation of a potential object. The range is 0 to 2π, and is discretizes into, e.g., 32 steps.

The set of all possible values is denoted as Θ.

The data structure $l^j(x, y, \theta, c)$ is the logarithm of the probability that there is an object (c=1) or no object (c=0) located at (x, y) and orientation θ, as derived from measurements of sensor j.

Generally, herein, a cell block refers to a finite, closed volume of the three-dimensional coordinate system, and a cell or lateral cell refers to a region in a two-dimensional sub-space of the three-dimensional coordinate system (for example, the x-y-plane, as also discussed further above).

The data structures $l^j(x, y, \theta, c)$ correspond to, for example, the first and second object pose probability data.

Referring again to FIG. 4, at 42-1 to 42-m, the features extracted from the respective sensor data are transferred into a Bird's-Eye-View (BEV) feature map, as will be discussed in the following.

Sensor-Specific Feature Maps $f^j(x, y)$

The information processing device 5 generates, based on the obtained first and second sensor data, a first and a second feature map ($f^1(x, y)$, $f^2(x, y)$), respectively.

Multiple sub-feature maps $f_i^j(x, y)$, $i=1, \ldots, n^j$ are defined, each consisting of one or more values feature components.

The feature components of the (sub)-feature maps are created sensor-specific and are defined in the discretized x-y-plane.

Hence, generally, the first and the second feature map, respectively, includes a plurality of sub-feature maps, wherein each of the plurality of sub-feature maps includes a plurality of lateral cells, wherein each lateral cell of the plurality of lateral cells is assigned at least a first feature component.

Examples are discussed in the following for a stereo camera, a LiDAR device, and a radar device.

Stereo camera: $f_i^j(x,y)=(q_i^j(x,y), r_i^j(x,y))$

From the two images of a stereo camera, the three-dimensional position ((x, y, z)) of a point visible in both images can be triangulated using established methods.

The coordinate of the nearest lateral cell of the feature map is then given by the (x, y), while the z-component indexes the feature i, e.g., $$i = \text{round}\left(\frac{z}{0.1}\right).$$

Hence, generally, each of the plurality of sub-feature maps ($f_i^j(x, y)$) is associated with one of a plurality of lateral cell block layers (which may also be indexed by $i=1, \ldots, n^j$) in a three-dimensional coordinate system (as discussed above, each lateral cell block layer has a predetermined z-component value).

In this embodiment, the sub-feature maps of the stereo camera include a first feature component $q_i^j(x, y)$ and a second feature component $r_i^j(x, y)$.

Figure 6:
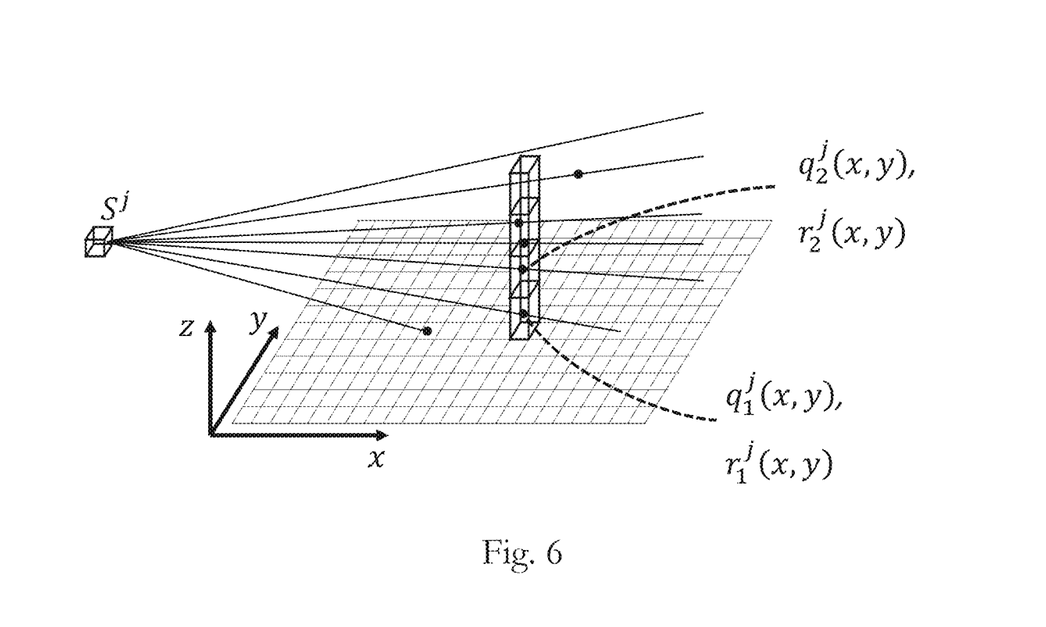
FIG. 6 schematically illustrates an embodiment of a first and a second feature component.

Referring now to FIG. 6, which schematically illustrates an embodiment of a first and a second feature component.

The first feature component $q_i^j(x, y)$ is increased by +1 for each measurement falling into cell (x, y) and sub-feature map i.

Furthermore, $r_i^j(x, y)$ is increased for each camera ray originating from the camera origin and going through a pixel of the camera that crosses this volume.

In other words, the second feature component $r_i^j(x, y)$ for the stereo camera is based on at least one of a field of view and a spatial resolution of the stereo camera.

LiDAR device: $f_i^j(x,y)=(q_i^j(x,y), r_i^j(x,y))$

Each laser reflection indicates a three-dimensional point ((x, y, z)) that is transferred to the feature map.

The coordinate of the nearest lateral cell of the feature map is then given by the (x, y), while the z-component indexes the feature i, e.g., $$i = \text{round}\left(\frac{z}{0.1}\right).$$

In this embodiment, the sub-feature maps of the stereo camera include a first feature component $q_i^j(x, y)$ and a second feature component $r_i^j(x, y)$.

Referring now to FIG. 6, the first feature component $q_i^j(x, y)$ is increased by +1 for each measurement falling into cell (x, y) and sub-feature map i.

Furthermore, $r_i^j(x, y)$ is increased for each layer ray originating from the LiDAR origin and going through this volume.

In other words, the second feature component $r_i^j(x, y)$ for the LiDAR device is based on at least one of a field of view and a spatial resolution of the LiDAR device.

Radar device: $f_i^j(x,y)=(q_i^j(x,y), r_i^j(x,y))$

The radar device outputs a four-dimensional beamformer array with axes radial distance, vertical and horizontal angle, radial velocity, and reflection strengths (detection signal strengths), which is transferred to the feature map as follows.

The array is first summed up along the radial velocity dimension, reducing it to a three-dimensional array.

For each array cell it is computed:
the Cartesian coordinates (x, y, z) in the three-dimensional coordinate system, computed from radial distance, vertical and horizontal angles,
a reflection strength, which is the value of the array element, and
a flag indicating whether the measurement in this cell is valid, e.g., within reasonable measurement ranges (for instance, determined by a predetermined threshold obtained in a previous calibration step).

Each value is associated to the feature map cell which is nearest to (x, y). If the measurement is valid, $q_i^j(x, y)$ (here, the second feature component) is increased by the reflection strength, and $r_i^j(x, y)$ (here, the first feature component) is increased by +1.

In other words, the second feature component $q_i^j(x, y)$ for the radar device is based on a detection signal strength.

Generally, as discussed above for the three examples, the first feature component corresponds to a number of features detected in a lateral cell block of the associated lateral cell block layer, wherein the lateral cell block is associated with a lateral cell of the associated sub-feature map.

Moreover, each lateral cell of the plurality of lateral cells is further assigned a second feature component, wherein the second feature component is based on at least one of a field of view of the respective sensor, a spatial resolution of the respective sensor, and a detection signal strength measured with the respective sensor.

Referring again to FIG. 4, at 43-1 to 43-m, the information processing device 5 obtains the respective object pose probability data based on a predetermined object pose probability model.

Figure 7:
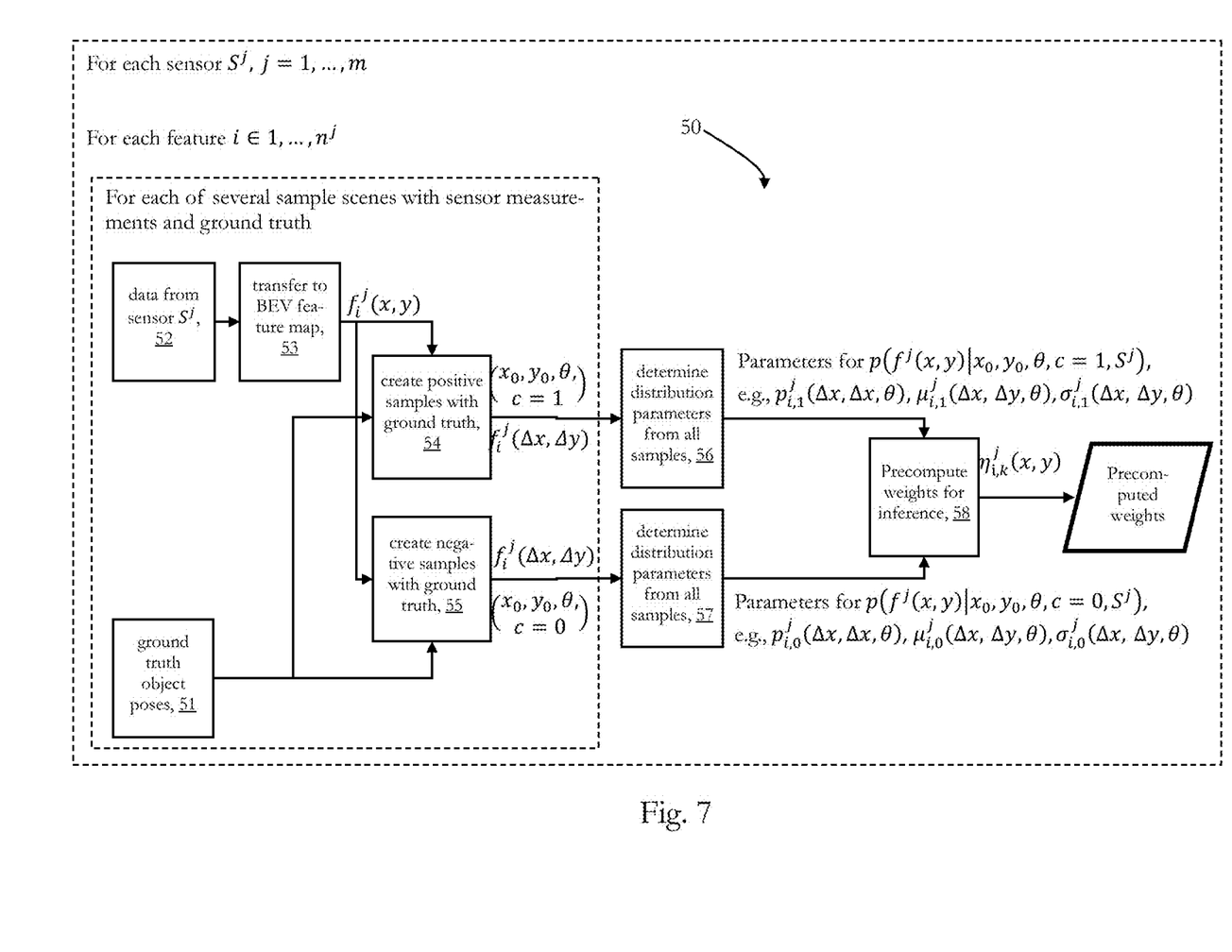
FIG. 7 schematically illustrates in a block diagram an embodiment of a training of a predetermined object pose probability model.

At first, an embodiment of a training 50 of the predetermined object pose probability model is discussed under reference of FIG. 7, which schematically illustrates the embodiment in a block diagram.

Training of the Predetermined Object Pose Probability Model

Generally, a probability distribution for training is chosen suitable for the specific sensor and feature maps.

Here, $\theta \in \Theta$ is the object orientation, $\Delta x$ and $\Delta y$ are the feature map positions relative to the assumed object center $(x_0, y_0)$, i.e. $(\Delta x, \Delta y)=(x, y)-(x_0, y_0)$, and c is the class indicating existence (c=1) or absence of the object (c=0).

EXAMPLES

Stereo camera: one binomial distribution per feature and class:

$q_i^j(x,y) \sim B(p_{i,c}^j(\Delta x, \Delta y, \theta), r_i^j(\Delta x, \Delta y))$ with parameter $p_{i,c}^j(\Delta x, \Delta y, \theta)$.

LiDAR device: same as for the stereo camera.

Radar device: one normal distribution per feature and class:

$q_i^j(x,y) \sim N(r_i^j(\Delta x, \Delta y) \mu_{i,c}^j(\Delta x, \Delta y, \theta), (r_i^j(\Delta x, \Delta y) \sigma_{i,c}^j(\Delta x, \Delta y, \theta))^2)$ with parameters $\mu_{i,c}^j(\Delta x, \Delta y, \theta) \sigma_{i,c}^j(\Delta x, \Delta y, \theta)$.

Definition of base functions: $B_{i,k}^j(f_i^j(x, y))$ and $b_i^j$

The logarithm of the distributions above is decomposed into a sum of the product of a function of the distribution parameters and a function of the feature components in $f_i^j(x, y)$ such that the following base functions are defined by the latter ones.

Stereo camera: $b_i^j=2, B_{i,1}^j(f_i^j(x,y))=q_i^j(x,y)$, and $B_{i,2}^j(f_i^j(x,y))=r_i^j(x,y)$.

LiDAR device: same as for the stereo camera.

Radar device: $b_i^j=3, B_{i,1}^j(f_i^j(x,y))=r_i^j(x,y), B_{i,2}^j(f_i^j(x,y))=r_i^j(x,y)q_i^j(x,y)$, and $B_{i,3}^j(f_i^j(x,y))=r_i^j(x,y)(q_i^j(x,y))^2$.

Referring now to FIG. 7, the samples for the training 50 may be created from real or simulated data and should be based on several scenes which are representative for the application.

The training 50 is performed, for example, by a server.

At 51, ground-truth object poses are obtained.

At 52, the real or simulated sensor data is obtained from, for example, a stereo camera and a radar device and a LiDAR device.

At 53, the sensor data is transferred to sensor-specific (sub)-feature maps $f_i^j(x, y)$.

At 54, positive samples with ground-truth are created, for c=1, i.e., with an object located in $(x_0, y_0)$ and having orientation $\theta \in \Theta$.

At 55, negative samples with ground-truth are created, for c=0, i.e., scenes without an object centered in $(x_0, y_0)$ and all orientations $\theta \in \Theta$.

At 56 and 57, parameters of $p(f^j(x, y)|x_0, y_0, \theta, c, S^j)$ are determined for a suitable region around $(\Delta x, \Delta y)=(0,0)$, e.g., $\Delta x$ and $\Delta y$ between −4.0 m and +4.0 m.

From all samples, the distribution parameters are estimated using standard methods:

Stereo camera: $p_{i,c}^j(\Delta x, \Delta y, \theta)$, which is the ratio of features having value 1 in all samples (proportion of success).

LiDAR device: same as for the stereo camera.

Radar device: $\mu_{i,c}^j(\Delta x, \Delta y, \theta), \sigma_{i,c}^j(\Delta x, \Delta y, \theta)$, which is the mean and covariance of the feature of all samples.

At 58, learned weights are precomputed for use in inference, as follows:

For all sensors in common: $\eta_0^j = \ln p(c=1) - \ln p(c=0)$.

Sensor Specific:

Stereo Camera:

$\eta_{i,1}^j(\Delta x, \Delta y, \Theta) = \ln p_{i,1}^j(\Delta x, \Delta y, \Theta) - \ln(1-p_{i,1}^j(\Delta x, \Delta y, \Theta)) - \ln(p_{i,0}^j(\Delta x, \Delta y, \Theta)) + \ln(1-p_{i,0}^j(\Delta x, \Delta y, \Theta))$, $\eta_{i,2}^j(\Delta x, \Delta y, \Theta) = \ln(1-p(\Delta x, \Delta y, \Theta)) - \ln(1-p_{i,0}^j(\Delta x, \Delta y, \Theta))$.

LiDAR device: same as for the stereo camera.

Radar Device:

$$\eta_{i,1}^j(\Delta x, \Delta y, \Theta) = -\frac{1}{2}(2\ln \sigma_{i,1}^j(\Delta x, \Delta y, \Theta) - 2\ln \sigma_{i,0}^j(\Delta x, \Delta y, \Theta) + (\sigma_{i,1}^j(\Delta x, \Delta y, \Theta))^{-2}(\mu_{i,1}^j(\Delta x, \Delta y, \Theta))^{-2} - (\sigma_{i,0}^j(\Delta x, \Delta y, \Theta))^{-2}(\mu_{i,0}^j(\Delta x, \Delta y, \Theta))^{-2}),$$

$$\eta_{i,2}^j(\Delta x, \Delta y, \Theta) = (\sigma_{i,1}^j(\Delta x, \Delta y, \Theta))^{-2}\mu_{i,1}^j(\Delta x, \Delta y, \Theta) - (\sigma_{i,0}^j(\Delta x, \Delta y, \Theta))^{-2}\mu_{i,0}^j(\Delta x, \Delta y, \Theta),$$

$$\eta_{i,3}^j(\Delta x, \Delta y, \Theta) = -\frac{1}{2}((\sigma_{i,1}^j(\Delta x, \Delta y, \Theta))^2 - (\sigma_{i,0}^j(\Delta x, \Delta y, \Theta))^2).$$

Referring again to FIG. 4, as mentioned above, at 43-1 to 43-m, the information processing device 5 obtains the respective object pose probability data based on a predetermined object pose probability model, which will be discussed in the following under reference of FIG. 8.

Inference, Fusion, Object Detection and Object Tracking:

For each sensor, the measurements are transferred into a common representation. The method is sensor-specific and transfers the low-level data to the common data structure defined above taking into account the properties, uncertainties, range and field of view.

The learned weights $\eta_{i,k}^j(\Delta x, \Delta y), \eta_0^j, b_i^j$ are precomputed and sensor-specific and the base functions $B_{i,k}^j$ are sensor-specific and are determined as described above.

Figure 8:
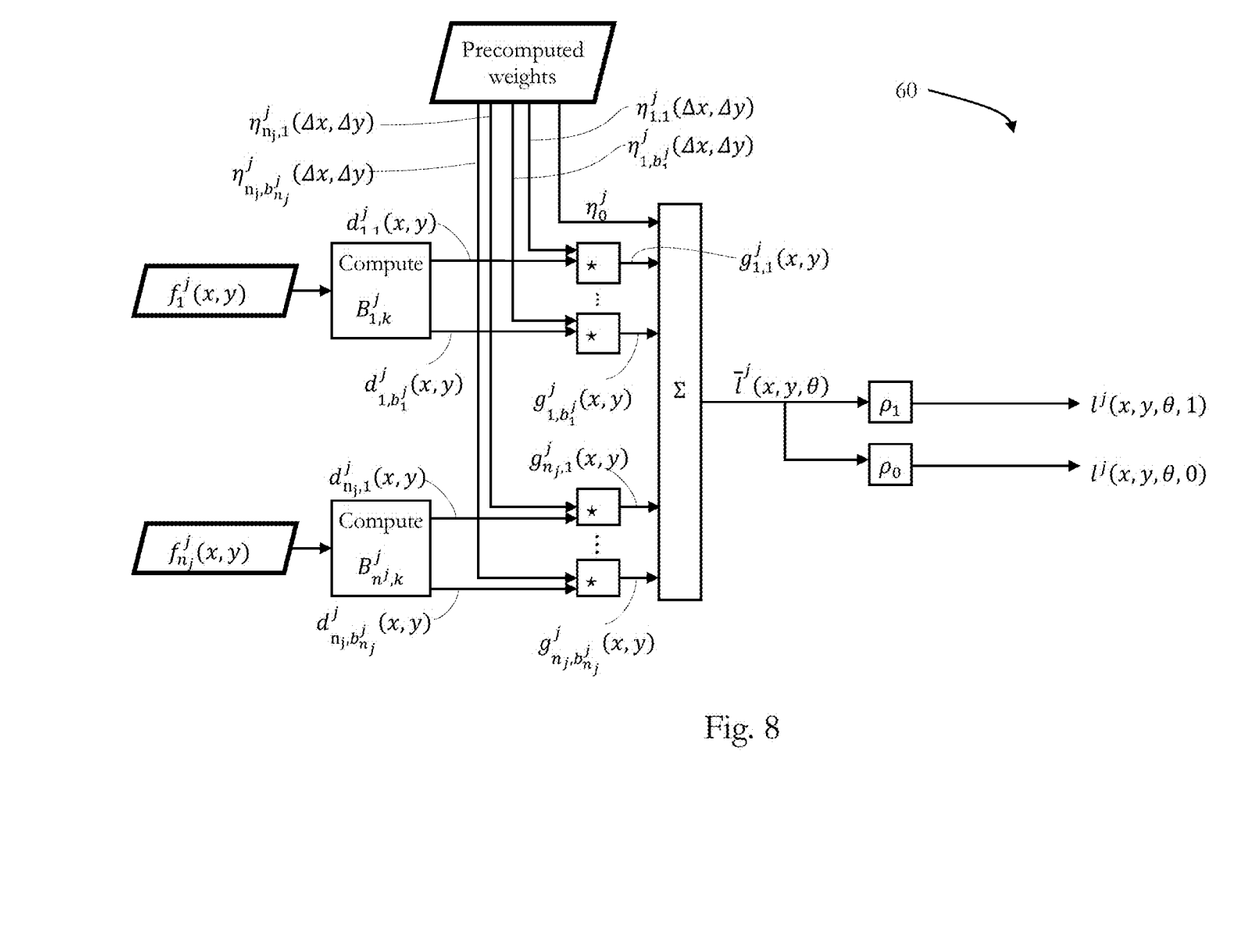
FIG. 8 schematically illustrates in a block diagram an embodiment of a generation of object pose probability data.

As illustrated in FIG. 8, the information processing device performs the following process:

Create feature map $f^j(x, y)$ of sensor $S^j$, see above.

Infer object pose probabilities:

The following lines implement the estimation of the computation of $l^j(x, y, \theta, c) = \log p(c|f^j(x, y), x, y, \theta, S^j)$ using Bayes formula:

$$p(c \mid f^j(x, y), x, y, \theta, S^j) = \frac{p(c)p(f^j(x, y) \mid c, x, y, \theta, S^j)}{p(f^j(x, y) \mid x, y, \theta, S^j)}$$

For each rotation $\theta \in \Theta$ do:

$l^j(x,y,\theta) \leftarrow \eta_0^j$ for all $x,y$

For each sub-feature map index $i \in 1, \ldots, n^j$

For each base function index $k \in 1, \ldots, b_i^j$ $d_{i,k}^j(x,y) \leftarrow B_{i,k}^j(f_i^j(x,y))$ for all $x,y$ $g_{i,k}^j(x,y) \leftarrow d_{i,k}^j(x,y) \star \eta_{i,k}^j(x,y)$, where ★ is the 2d cross correlation operator along x, y (implemented as convolution), $l^j(x,y,\theta) \leftarrow l^j(x,y,\theta) + g(x,y,\theta)$ normalize: $l^j(x, y, \theta) \leftarrow \rho_c(l^j(x, y, \theta))$, where:

$$\rho_c(l) := -\log 1 p(\exp(-|l|)) + \begin{cases} +\min\{0, l\} & \text{if } c = 1 \\ -\min\{0, l\} & \text{if } c = 0 \end{cases}$$

and log $1p(x):=\ln(1+x)$, but optimized for numerical stability.

transfer $l^j(x, y, \theta, 1)$ to fusion stage

Referring again to FIG. 4, at 44, the information processing device 5 fuses all the object pose probability data for object detection.

All sensor information is fused by adding probabilities elementwise:

$$l(x,y,\theta,1) \leftarrow \Sigma_{j=1}^{m} l^j(x,y,\theta,1) \text{ for each } x,y,\theta.$$

at 45, the information processing device 5 detects local maxima using non-maxima suppression on l(x, y, θ, 1). The location in the volume indicates the center and orientation of the object.

at 46, the information processing device 5 tracks the object, for example, by using known tracker such as Extended Kalman Filter (EKF) for temporal fusion and filtering, bicycle model as dynamic model for the EKF, and the Hungarian algorithm for data association.

Extensions and Modifications of the Embodiments Discussed Under Reference of FIGS. 4, 5, 6, 7 and 8:

1) Distributed Fusion

Instead of transporting all sensor information into one central block and fusing there, the fusion can be performed in a hierarchical way. The result does not change (except for rounding errors) by changing the order of the fusion steps.

As an example, co-located sensors can be fused first, then transported to a central unit.

2) Data Compression

While the fusion data structure is defined above on a wide area—e.g., completely surrounding the (ego) vehicle —, most sensors can only contribute to a subset of the region. Transferring the data for the whole requires unnecessary bandwidth. Thus, data compression can be implemented by identifying one or more regions which contain relevant information and sending only a region description and the probabilities in there.

For regions outside defined regions, ln p(c=1|x, y, θ)=ln p(c=0|x, y, θ)=ln 0.5 is defined, which does not need to be transferred. Strategies for identifying relevant regions can be, for example:

Use a fixed region enclosing the region covered by the sensor's range and field-of-view.

Use an adaptive method for locating regions with a significant number of probabilities larger or smaller than 0.5.

Find a 3d mixture of Gaussians representation.

3) Artificial Neural Networks as Machine Learning Components

The inference and fusion process described above can be considered as a one-layer CNN with channel sum-pooling and activation function $\rho_c(l)$, and element-wise summation (fusion), but with weights learned in optimal, closed form.

Alternatively, a multi-layer CNN for 2-class classification, can be trained per sensor, using data with ground truth.

For each discretized position (x, y) and orientation θ, a binary classifier outputs class 1 for true poses and 0 for others.

After additionally converting the output to log probabilities, the resulting network replaces the inference process.

The inferred classes need to be converted to log probabilities to fuse them.

The network might be designed as a multiscale hourglass network with residual blocks and trained with statistical gradient descent.

4) Other Object Classes and Multi-Object Classification

By choosing data with ground truth for, e.g., motorbikes, bicycles, pedestrians, separate detectors for different object classes can be trained.

Multi-object classification can be implemented as separate binary classifiers running in parallel (but sharing some computational elements). Conflicting results—e.g., the classifiers for bicycle and motorbike both see a high probability at the same position—can be resolved by only choosing the one with the highest probability.

Figure 9:
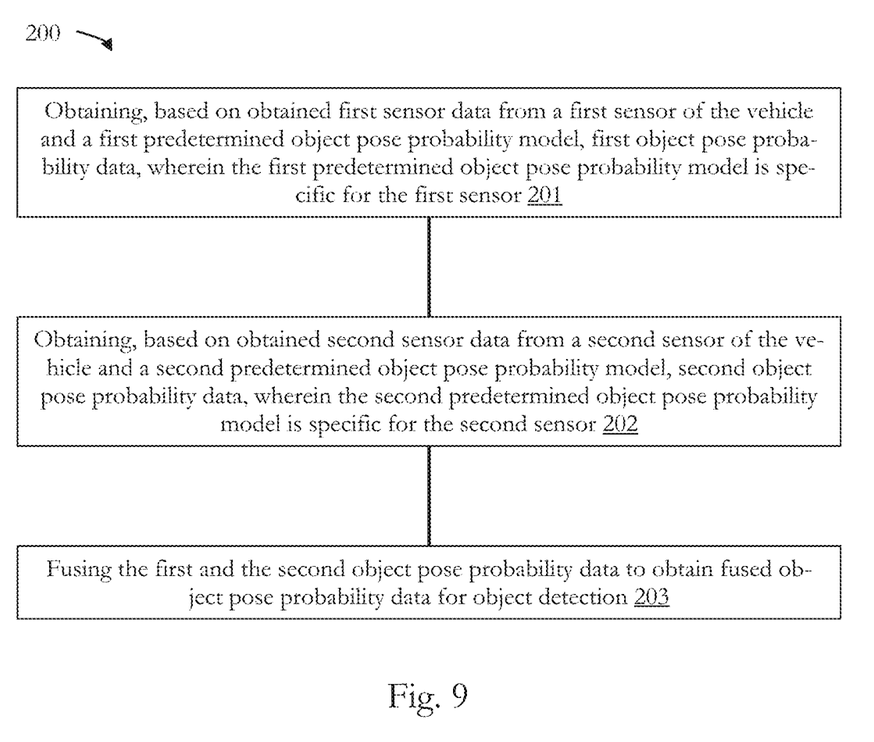
FIG. 9 schematically illustrates in a flow diagram an embodiment of an information processing method for object detection.

FIG. 9 schematically illustrates in a flow diagram an embodiment of an information processing method 200 for object detection.

At 201, based on obtained first sensor data from a first sensor of the vehicle and a first predetermined object pose probability model, first object pose probability data is obtained, wherein the first predetermined object pose probability model is specific for the first sensor, as discussed herein.

At 202, based on obtained second sensor data from a second sensor of the vehicle and a second predetermined object pose probability model, second object pose probability data is obtained, wherein the second predetermined object pose probability model is specific for the second sensor, as discussed herein.

At 203, the first and the second object pose probability data is fused to obtain fused object pose probability data for object detection, as discussed herein.

Returning to the general explanations, at least one of the following may be achieved/provided in some embodiments by the information processing device and the information processing method as described herein: The proposed method fuses information at an early abstraction level before sensor-specific processing of measurements can discard relevant information or introduce false ones.

Sensor- and situation-specific strengths and weaknesses in detecting object centers and orientation can be encoded in the common data structure. This allows to correctly take them into account during the fusion process, thus improving precision.

The method supports fusing different sensor modalities, varying quantities of sensors, both overlapping and complementing field of views.

The method is sensor-agnostic, i.e., does not prerequisite or favor measurements from a specific modality.

The required transfer from low-level measurements to the common data structure can be trained independently. Thus, scaling to more sensors is more cost-efficient at training time compared to methods training fusion of sensors together, and just an additional additive combination of the fusion results.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An information processing device for a vehicle for sensor data fusion for object detection, wherein the information processing device includes circuitry configured to:
obtain, based on obtained first sensor data from a first sensor of the vehicle and a first predetermined object pose probability model, first object pose probability data, wherein the first predetermined object pose probability model is specific for the first sensor;
obtain, based on obtained second sensor data from a second sensor of the vehicle and a second predetermined object pose probability model, second object pose probability data, wherein the second predetermined object pose probability model is specific for the second sensor; and
fuse the first and the second object pose probability data to obtain fused object pose probability data for object detection.

(2) The information processing device of (1), wherein the circuitry is further configured to detect an object, based on the fused object pose probability data.

(3) The information processing device of (2), wherein the circuitry is further configured detect extrema in the fused object pose probability data, and to detect the object based on the detected extrema.

(4) The information processing device of anyone of (1) to (3), wherein the circuitry is configured to obtain, in the first and the second predetermined object pose probability model, the first and the second object pose probability data based on learned weights.

(5) The information processing device of (4), wherein the learned weights are precomputed.

(6) The information processing device of (4) or (5), wherein the circuitry is further configured to generate, based on the obtained first and second sensor data, a first and a second feature map, respectively.

(7) The information processing device of (6), wherein the first and the second feature map, respectively, includes a plurality of sub-feature maps, wherein each of the plurality of sub-feature maps is associated with one of a plurality of lateral cell block layers in a three-dimensional coordinate system, wherein the three-dimensional coordinate system is divided into a plurality of cell blocks arranged in lateral cell block layers, wherein the lateral cell block layers are stacked.

(8) The information processing device of (7), wherein each of the plurality of sub-feature maps includes a plurality of lateral cells, wherein each lateral cell of the plurality of lateral cells is assigned at least a first feature component.

(9) The information processing device of (8), wherein the first feature component corresponds to a number of features detected in a lateral cell block of the associated lateral cell block layer, wherein the lateral cell block is associated with a lateral cell of the associated sub-feature map.

(10) The information processing device of (8) or (9), wherein each lateral cell of the plurality of lateral cells is further assigned a second feature component, wherein the second feature component is based on at least one of a field of view of the respective sensor, a spatial resolution of the respective sensor, and a detection signal strength measured with the respective sensor.

(11) The information processing device of (10), wherein, for a stereo camera or a light-detection-and-ranging device as a sensor, the second feature component is based on a field of view and the spatial resolution of the stereo camera.

(12) The information processing device of (10) or (11), wherein, for a radar device as a sensor, the second feature component is based on a detection signal strength.

(13) The information processing device of anyone of (10) to (12), wherein the circuitry is configured to obtain the first and the second object pose probability data by a convolution of base functions with the learned weights.

(14) The information processing device of (13), wherein the base functions depend on the feature map.

(15) The information processing device of (14), wherein the base functions are based on the first and second feature component.

(16) The information processing device of anyone of (4) to (15), wherein the learned weights are learned for at least one predetermined object type.

(17) The information processing device of anyone of (4) to (16), wherein the learned weights are weights of a neural network.

(18) The information processing device of anyone of (1) to (17), wherein the circuitry is further configured to detect a region of interest based on at least one of the first and second object pose probability data.

(19) The information processing device of (18), wherein the circuitry is further configured to fuse the first and the second object pose probability data only for the detected region of interest.

(20) An information processing method for a vehicle for sensor data fusion for object detection, wherein the information processing method includes:
obtaining, based on obtained first sensor data from a first sensor of the vehicle and a first predetermined object pose probability model, first object pose probability data, wherein the first predetermined object pose probability model is specific for the first sensor;
obtaining, based on obtained second sensor data from a second sensor of the vehicle and a second predetermined object pose probability model, second object pose probability data, wherein the second predetermined object pose probability model is specific for the second sensor; and
fusing the first and the second object pose probability data to obtain fused object pose probability data for object detection.

(21) A computer program comprising program code causing a computer to perform the method according to (20), when being carried out on a computer.

(22) A non-transitory computer-readable recording medium that stores therein a computer program product, which, when executed by a processor, causes the method according to (20) to be performed.

The invention claimed is:

1. An information processing device for a vehicle for sensor data fusion for object detection, comprising circuitry configured to:
obtain, based on obtained first sensor data from a first sensor of the vehicle and a first predetermined object pose probability model, first object pose probability data, wherein the first predetermined object pose probability model is specific for the first sensor;
obtain, based on obtained second sensor data from a second sensor of the vehicle and a second predetermined object pose probability model, second object pose probability data, wherein the second predetermined object pose probability model is specific for the second sensor; and fuse the first and the second object pose probability data to obtain fused object pose probability data for object detection.

2. The information processing device according to claim 1, wherein the circuitry is further configured to detect an object, based on the fused object pose probability data.

3. The information processing device according to claim 2, wherein the circuitry is further configured detect extrema in the fused object pose probability data, and to detect the object based on the detected extrema.

4. The information processing device according to claim 1, wherein the circuitry is configured to obtain, in the first and the second predetermined object pose probability model, the first and the second object pose probability data based on learned weights.

5. The information processing device according to claim 4, wherein the learned weights are precomputed.

6. The information processing device according to claim 4, wherein the circuitry is further configured to generate, based on the obtained first and second sensor data, a first and a second feature map, respectively.

7. The information processing device according to claim 6, wherein the first and the second feature map, respectively, includes a plurality of sub-feature maps, wherein each of the plurality of sub-feature maps is associated with one of a plurality of lateral cell block layers in a three-dimensional coordinate system, wherein the three-dimensional coordinate system is divided into a plurality of cell blocks arranged in lateral cell block layers, wherein the lateral cell block layers are stacked.

8. The information processing device according to claim 7, wherein each of the plurality of sub-feature maps includes a plurality of lateral cells, wherein each lateral cell of the plurality of lateral cells is assigned at least a first feature component.

9. The information processing device according to claim 8, wherein the first feature component corresponds to a number of features detected in a lateral cell block of the associated lateral cell block layer, wherein the lateral cell block is associated with a lateral cell of the associated sub-feature map.

10. The information processing device according to claim 8, wherein each lateral cell of the plurality of lateral cells is further assigned a second feature component, wherein the second feature component is based on at least one of a field of view of the respective sensor, a spatial resolution of the respective sensor, and a detection signal strength measured with the respective sensor.

11. The information processing device according to claim 10, wherein, for a stereo camera or a light-detection-and-ranging device as a sensor, the second feature component is based on a field of view and the spatial resolution of the stereo camera.

12. The information processing device according to claim 10, wherein, for a radar device as a sensor, the second feature component is based on a detection signal strength.

13. The information processing device according to claim 10, wherein the circuitry is configured to obtain the first and the second object pose probability data by a convolution of base functions with the learned weights.

14. The information processing device according to claim 13, wherein the base functions depend on the feature map.

15. The information processing device according to claim 14, wherein the base functions are based on the first and second feature component.

16. The information processing device according to claim 4, wherein the learned weights are learned for at least one predetermined object type.

17. The information processing device according to claim 4, wherein the learned weights are weights of a neural network.

18. The information processing device according to claim 1, wherein the circuitry is further configured to detect a region of interest based on at least one of the first and second object pose probability data.

19. The information processing device according to claim 18, wherein the circuitry is further configured to fuse the first and the second object pose probability data only for the detected region of interest.

20. An information processing method for a vehicle for sensor data fusion for object detection, comprising:
  obtaining, based on obtained first sensor data from a first sensor of the vehicle and a first predetermined object pose probability model, first object pose probability data, wherein the first predetermined object pose probability model is specific for the first sensor;
  obtaining, based on obtained second sensor data from a second sensor of the vehicle and a second predetermined object pose probability model, second object pose probability data, wherein the second predetermined object pose probability model is specific for the second sensor; and
  fusing the first and the second object pose probability data to obtain fused object pose probability data for object detection.

* * * * *